United States Patent Office 3,555,138
Patented Jan. 12, 1971

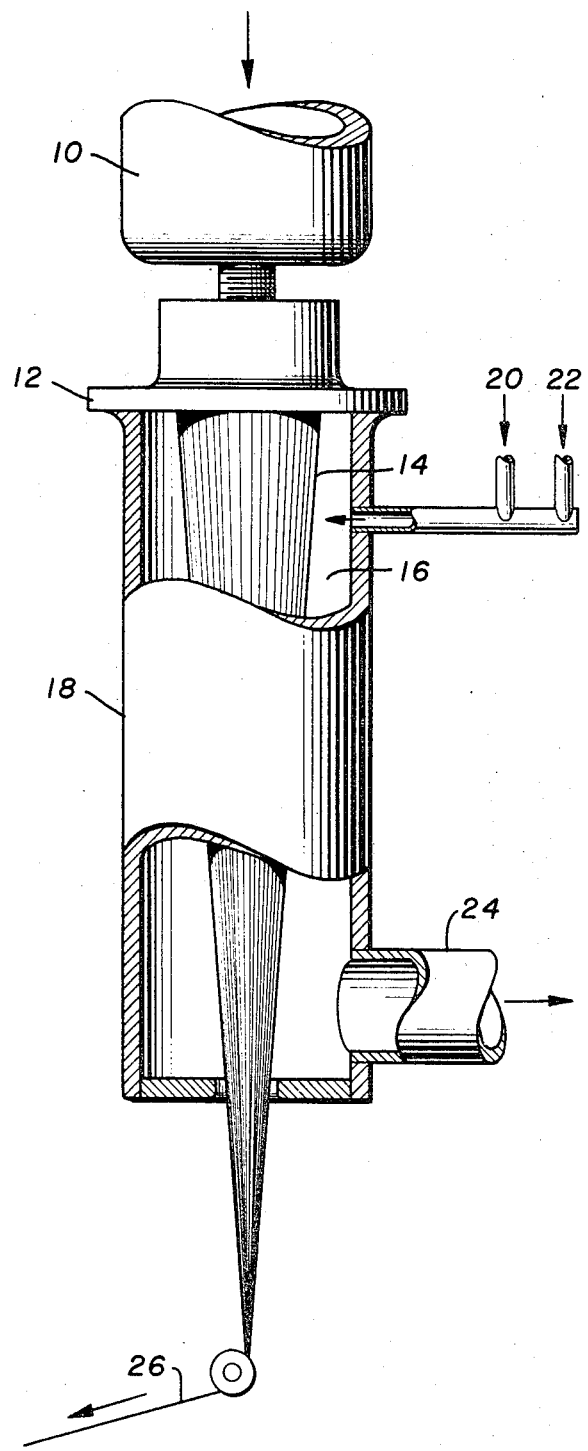

3,555,138
SURFACE HALOGENATION OF
SHAPED ARTICLES
Roland Jennings Bryan, Jr., Raleigh, N.C., assignor to Monsanto Company, St. Louis, Mo., a corporation of Delaware
Filed June 17, 1966, Ser. No. 558,400
Int. Cl. D01d 5/10
U.S. Cl. 264—210    8 Claims

ABSTRACT OF THE DISCLOSURE

A continuous process for the halogenation of melt spun filaments consists of extruding the filaments directly into a gaseous atmosphere comprising a halogen gas which enables halogenation to be accomplished without the need for extraneous halogenation initiators.

---

The invention relates to a novel method for the halogenation of shaped articles of synthetic organic polymers.

More particularly, this invention relates to an improvement in the method of continuously halogenating filaments and films of melt extruded synthetic organic polymers.

Halogenation of the surface of shaped articles made from synthetic organic polymers such as polyesters and polyolefins has previously been described in the art as a means for modifying the surface properties to increase adhesion of inks and other coatings to the surface of the articles so treated.

Filaments and films of polymers having significant concentration of halogen attached to their surfaces also offer sites for secondary reactions making it possible to further modify the properties of filaments and films. Thus, primary and secondary mono and polyamines may be reacted with the halogen atoms substituted on the surface of the filaments or films to further modify the chemistry and physical properties of the surface. Amines so substituted may be quaternied to enhance the anti-static properties in a manner similar to that provided through use of conventional anti-static agents. Groups so attached to provide anti-static properties are permanent, whereas, prior art anti-static coatings are generally diminished or removed by ordinary laundering and dry cleaning procedures. The prior art processes generally involve halogenation of oriented articles by passing them into a halogenation zone comprising halogen gases or solutions of halogens in the presence of ultraviolet light.

An object of this invention is to provide an improved method for halogenation of shaped articles made from synthetic organic polymers.

Another object of ths invention is to provide an integrated continuous process for the halogenation of melt spun filaments and films of synthetic organic polymers in the absence of extraneous halogenation initiators.

These and other objects are accomplished by melt extrusion of a synthetic organic polymer directly into a gaseous atmosphere comprising a halogen gas.

The improvements of this process can be readily accomplished by employing the apparatus depicted in the accompanying drawing. Thus polymer flake is fed to an autoclave 10, melted and then pumped to an extrusion device, such as the spinnerette 12 shown in the drawing, and extruded to form a filament 14 or film. This technique for the formation of shaped articles is conventional and well known to those skilled in the art. The critical feature of the instant invention lies in extrusion of the filament or film directly into an atmosphere 16 rich in halogen gas. This may be accomplished by surrounding the outer face of the extrusion orifice or spinnerette 12 with a tube or chamber 18 having means 20 and 22 for feeding the halogen gas and inert carrier gas into the chamber, means 24 for removal of exhaust gases and means for removing the continuously advancing thread line 26 or film through the chamber. The chamber is preferably made of a transparent material to allow observation of the spinnerette. The chamber may be removable or it may have means for access to facilitate periodic cleaning the face of the spinnerette so that removal of the entire chamber is not necessary.

The process of the invention provides up to about 5,000 parts per million of halogen based on the weight of the polymer attached predominantly to the surface molecules of the shaped organic polymer. It has been discovered that halogenation of the freshly extruded shaped article may be readily and effectively accomplished without the necessity for extraneous halogenation initiators, such as ultraviolet light.

Another benefit resulting from the process of this invention lies in the discovery that the halogen is permannently bonded to the polymer. Tests conducted on oriented nylon articles indicate that halogenation in the absence of ultraviolet light results in impermanent bonding of halogen atoms to the polymer molecules as evidenced by large decreases in halogen concentration after washing. This may be due to the formation of hydrolyzable complexes, rather than covalent bonds. In any case, samples of nylon filaments chlorinated according to this invention do not exhibit loss of chlorine upon washing even though no ultraviolet light initiator is employed.

The process of this invention is applicable to shaped articles prepared from any thermoplastic synthetic organic polymers which can be halogenated in bulk. Thus, the process is applicable to the halogenation of melt extruded polyamides such as polyhexamethyleneadipamide, polyesters such as polyethylene terephthalate, polyurethanes including segmented polyurethanes, such as the spandex polymers, polyolefins such as polyethylene and polypropylene and the like.

After halogenation the freshly extruded articles may be quenched, taken up on bobbins or given any other treatment conventionally applied in the manufacture of filaments and films.

The term halogen herein includes gases such as chlorine and bromine and is also intended to apply to mixtures thereof. The halogen gas fed to the halogenation zone or chamber may be diluted with an inert gas. Generally, it has been found that where low denier filaments for textile application are halogenated, fewer breaks in the thread line occur when a gas such as nitrogen is fed into the zone along with the halogen gas. The presence of small amounts of oxygen or water do not appreciably change the reaction. However, large quantites of oxygen and water should be avoided because of the possibility of side reactions. The atmosphere into which the polymer is extruded should contain from about 15 to 100 percent by weight of halogen. Optimum concentration for a particular use may be readily determined for a given extrusion rate and maintained by continuously charging the reaction zone with halogen gas, with or without a diluent gas.

Where ample concentrations of halogen are present in the reaction zone levels of halogen as high as 0.5 percent by weight of the polymer can be obtained at standard commercial extrusion rates. The residence time of the extruded article in the halogenation zone generally runs less than four seconds, normally less than one second.

Although the temperature of the reaction zone may be elevated by an extraneous source of heat, the heat provided by the extrudate is generally adequate to insure the desired degree of halogenation within the limits of the invention. Insofar as maintenance of normal spinning conditions as early as possible to those which would be employed in the absence of halogenation, it is preferred that no extraneous heat source be employed since the normal quenching characteristics of the extruded articles are likely to be altered.

The volume of the reaction zone or reaction chamber has not been found to be a critical aspect of this invention so long as there is an adequate concentration of halogen gas in the reaction zone and so long as the length of the reaction zone accommodates the required period of residence of the shaped article in the reaction zone at a given rate of extrusion.

EXAMPLE I

About 175 grams hexamethylene ammonium adipate and 58 ml. water were charged to a high pressure stainless steel autoclave and purged with nitrogen. The contents were heated at 243° C. while maintaining a pressure of 250 p.s.i.g. During the heating period the reaction mixture was continuously agitated by means of a stirrer. The pressure was reduced to atmospheric over a 25 minute period while the temperature of the reaction mixture approaches 275° C. The polymer melt was allowed to equilibrate for 30 minutes at 275–289° C. and then spun through a four-hole spinnerette into an apparatus used for chlorination consisting of a 3½ inch x 22 inch Vycor glass tube with a 7½ inch open end metal extension at the bottom. Extending laterally from the extension was a 4 inch flexible exhaust tube leading to the laboratory hood. A mixture of nitrogen and chlorine was metered through a polyethylene tube situated so that it lies vertically on the inside glass wall with the exit about 3 inches from the spinnerete face.

Chlorine and nitrogen gases were introduced at rates of 0.035 and 0.028 cu. ft./min., respectievly, so that the atmosphere inside the tube was replaced every 117 seconds. The fiber was taken up on bobbins at a rate of 157 ft./min. providing a residence time of less than 0.8 second inside the chlorination tube. The filament was thereafter drawn as indicated below.

A control filament was spun in an identical manner in the absence of chlorine and ultraviolet light.

PROPERTIES OF CONTROL AND CHLORINATED SAMPLES

| | Draw ratio | Elongation percent | Tenacity | Modulus | Percent Cl |
|---|---|---|---|---|---|
| Control | 5.75 | 19.9 | 5.8 | 32 | (¹) |
| Chlorinated | 4.65 | 32.9 | 3.5 | 27 | 0.21 |

¹ Too low to detect.

The percent chlorine figure is equivalent to 2100 parts per million. In similar examples, chlorination levels based on weight of polyamide reached 4000 p.p.m.

Tenacity reduction is noticeable. However, tenacities of 3–5 grams per denier are quite adequate for most uses; and, if desired, chlorination can be held to a lower level, and still achieve significant surface effects and a reasonable concentration of sites for secondary reactions.

EXAMPLE II

A polymer of nylon 66 having a relative viscosity of 50.7, $52.4 \times 10^{-6}$ eq./gm. of carboxyl end groups and $59.3 \times 10^{-6}$ eq./gm. of amine end groups was extruded into air to form a monofilament which was then drawn without application of finsh. Several samples of the drawn filament were passed through a glass tube having an atmosphere rich with gaseous chlorine and exposed up to 7 seconds to the light of a 4 watt black light lamp emitting light having wave lengths ranging from 3000 to 4000 Angstroms. While the tensile properties of the drawn filaments were noticeably reduced when compared with a control, halogen concentrations did not exceed about 180 parts per million at the surface of the filaments.

I claim:
1. A continuous process for the surface halogenation of a shaped article of a thermoplastic synthetic organic polymer which comprises melt extruding said polymer directly into a reaction zone containing an atmosphere rich in a halogen gas in the absence of extraneous halogenation initiators to form a filament and maintaining the filament in the reaction zone for a period of time of less than about 4 seconds.

2. The process of claim 1 wherein said shaped article is selected from the group consisting of a film and a filament.

3. The process of claim 1 wherein the halogen is chlorine.

4. The process of claim 3 wherein the polymer is a polyamide.

5. The process of claim 3 wherein the polymer is a polyester.

6. The process of claim 3 wherein the polymer is a polyolefin.

7. In a continuous process for the surface halogenation of a polyamide filament wherein the filament is contacted with a gaseous halogen, the improvement which comprises extruding said polyamide directly into a reaction zone rich in said gaseous halogen in the absence of extraneous halogenation initiators and maintaining the filament in the reaction zone for a period of time of less than about 4 seconds.

8. The improvement of claim 7 wherein said gaseous halogen is chlorine and said polyamide is polyhexamethylene adipamide.

References Cited

UNITED STATES PATENTS

| 2,502,841 | 4/1950 | Henderson | 264—83 |
| 2,715,077 | 8/1955 | Wolinski | 264—83 |
| 2,829,070 | 4/1958 | Osborn | 264—83 |
| 3,075,823 | 1/1963 | Reyerson et al. | 260—78 |

MORRIS LIEBMAN, Primary Examiner

T. MORRIS, Assistant Examiner